(12) United States Patent
Tevanian, Jr.

(10) Patent No.: US 7,788,594 B1
(45) Date of Patent: Aug. 31, 2010

(54) METHODS AND APPARATUSES FOR INPUTTING INFORMATION

(75) Inventor: Avadis Tevanian, Jr., Los Altos Hills, CA (US)

(73) Assignee: Apple Inc., Cupertino, CA (US)

(*) Notice: Subject to any disclaimer, the term of this patent is extended or adjusted under 35 U.S.C. 154(b) by 1030 days.

(21) Appl. No.: 11/040,260

(22) Filed: Jan. 19, 2005

(51) Int. Cl.
G06F 3/048 (2006.01)

(52) U.S. Cl. ............ 715/780; 715/764; 715/785; 715/810; 715/823; 715/835; 715/856; 715/862; 715/968

(58) Field of Classification Search .......... 715/780, 715/835, 810, 785, 856, 862, 843, 968, 764, 715/823; 707/3, 4
See application file for complete search history.

(56) References Cited

U.S. PATENT DOCUMENTS

| | | | |
|---|---|---|---|
| 5,247,611 A * | 9/1993 | Norden-Paul et al. ....... | 715/217 |
| 5,600,778 A * | 2/1997 | Swanson et al. .......... | 715/762 |
| 6,137,488 A * | 10/2000 | Kraft et al. .......... | 715/866 |
| 6,469,722 B1 | 10/2002 | Kinoe et al. | |
| 6,742,162 B2 * | 5/2004 | Bennett ............ | 715/217 |
| 6,839,575 B2 * | 1/2005 | Ostergaard ............ | 455/566 |
| 7,007,239 B1 * | 2/2006 | Hawkins et al. ........... | 715/780 |
| 7,100,123 B1 * | 8/2006 | Todd et al. ............ | 715/862 |
| 7,346,858 B1 * | 3/2008 | Berg et al. ............ | 715/853 |
| 7,640,162 B2 * | 12/2009 | Ramsey et al. ........... | 704/270 |
| 7,685,116 B2 * | 3/2010 | Pell et al. ............ | 1/1 |
| 2006/0090142 A1 * | 4/2006 | Glasgow et al. ........... | 715/780 |

OTHER PUBLICATIONS

University of Miami Department of Information Technology, "Microsoft Excel 2000 Manual", Oct. 2001.*

* cited by examiner

Primary Examiner—Steven P Sax
Assistant Examiner—Grant D Johnson
(74) Attorney, Agent, or Firm—Blakely, Sokoloff, Taylor & Zafman LLP

(57) ABSTRACT

Methods and apparatuses for presenting a data input interface. In one exemplary embodiment of a method described herein, a text input field is displayed and, through a first input to the text input field itself, a selection between at least a first operation and a second operation can be made. A first input is received to determine a selected operation which is one of the first operation or the second operation, and a text input is received and the selected operation is performed. Other methods are described, and apparatuses are also described.

35 Claims, 8 Drawing Sheets

METHODS AND APPARATUSES FOR INPUTTING INFORMATION

BACKGROUND OF THE INVENTION

Modern data processing systems, such as general purpose computer systems, typically allow a user to enter text within a program, such as a web browser or other types of programs. The text entry often occurs within a text input field which is a pre-determined area of a graphical user interface. A text input field typically can accept no more than a pre-determined number of text characters which are entered by a user. In a typical graphical user interface, such as a modern web browser, the user will enter text by positioning a typing cursor within the text input field. This may be performed by positioning a cursor, through a cursor control device such as a mouse, into the text input field. Once the typing cursor has been placed into the text input or entry field, then the user may begin to enter text (e.g. by typing or speaking through speech recognition) into the text input field. A user can then cause the data processing system to perform an operation using the text, such as a search through a database or other source of information using the inputted text stream as a search query.

Certain graphical user interfaces allow for different operations to be performed with the inputted text. FIG. 1A shows an example of such a user interface 10 which includes a text entry field 11 into which a user may enter text. A pull down menu 12 includes a pull down button 14 and a plurality of options 15, 16, and 17 which the user may select from the pull down menu 12. The pull down menu 12 allows a user to search on a local storage device if the option 15 is selected or to search on a remote server if the option 16 is selected or to search in a Folder A if the option 17 is selected. Thus, through the use of a pull down menu the source of data, which may be searched based upon the inputted text string within the text field 11, will be changed by changing the option which is selected through the pull down menu 12. An example of this graphical user interface can be found in the upper right hand corner of a Finder window of the Panther operating system (Macintosh OS 10.3) from Apple Computer Inc. of Cupertino, Calif.

FIG. 1B shows another example in the prior art of a user interface which allows a user to input text. In the case of the user interface 20 shown in FIG. 1B, separate text entry fields 21 and 22 are provided to allow for separate operations using the entered text. Thus, rather than using a single text entry field as in the case of the interface of FIG. 1A, two separate text entry fields are provided to a user to allow for two different uses of the entered text. For example, the user may enter text into field 21 to cause a local search of local storage or may enter text into field 22 to cause a search of a data source in a remote server. The advantage of the interface 20 of FIG. 1B is that the display of indicators 21A and 22A will tell a user the purpose or use of each corresponding text entry field whereas a user in the case of interface 10 must activate the pull down menu to determine the function or operation which will be performed using the entered text in text entry field 11. However, the interface 20 of FIG. 1B occupies more display space than the interface 10, particularly since the interface 10 normally does not include the options in the pull down menu when the pull down menu is not activated (rather only the pull down button 14 is displayed when the pull down menu is not activated).

SUMMARY OF THE DESCRIPTION

Various methods, apparatuses, systems and software media are described herein in connection with a user interface.

In one exemplary embodiment of a method described herein, the method includes displaying a text input field which, through a first input to the text input field itself, can select between at least a first operation and a second operation, and the method also includes receiving the first input to determine the selected operation which is one of the first operation or the second operation, and receiving a text input and performing the selected operation using the text inputted into the text input field. In one example of this embodiment, the first operation is a text search through a first source of data and the second operation is a text search through a second source of information. The text input field may include a separator within the field which indicates a first portion of the field and a second portion of the field which is separated by the separator. The first input may include the placement of a cursor within either portion to select between either the first operation or the second operation depending upon which portion is selected.

In certain embodiments described herein, the processing of inputted data into a text input field is determined by a direct, graphical user interface interaction within the text input field itself (e.g. the same portion of the field which is used to enter text and which is capable of receiving text) to change the operations performed using text which has been entered into the text input field. Other embodiments are also described.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc.

Figure 1A:
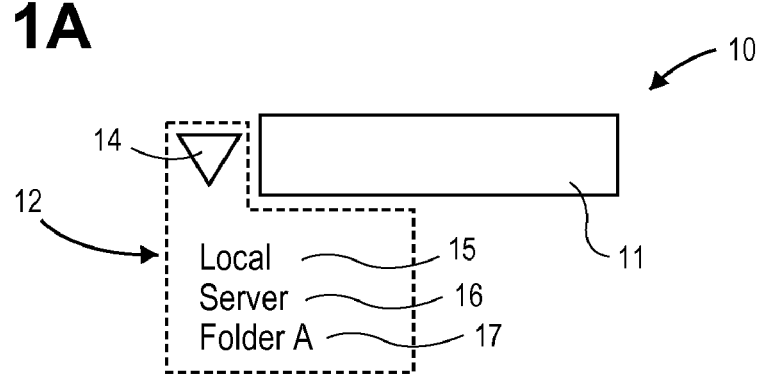
FIG. 1A shows an example in the prior art of a user interface which includes a text entry field.
Figure 1B:
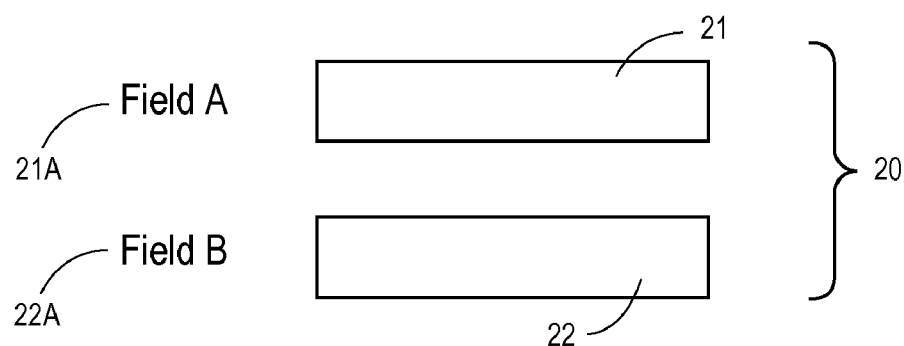
FIG. 1B shows another example in the prior art of a user interface which includes at least one text entry field.
Figure 2:
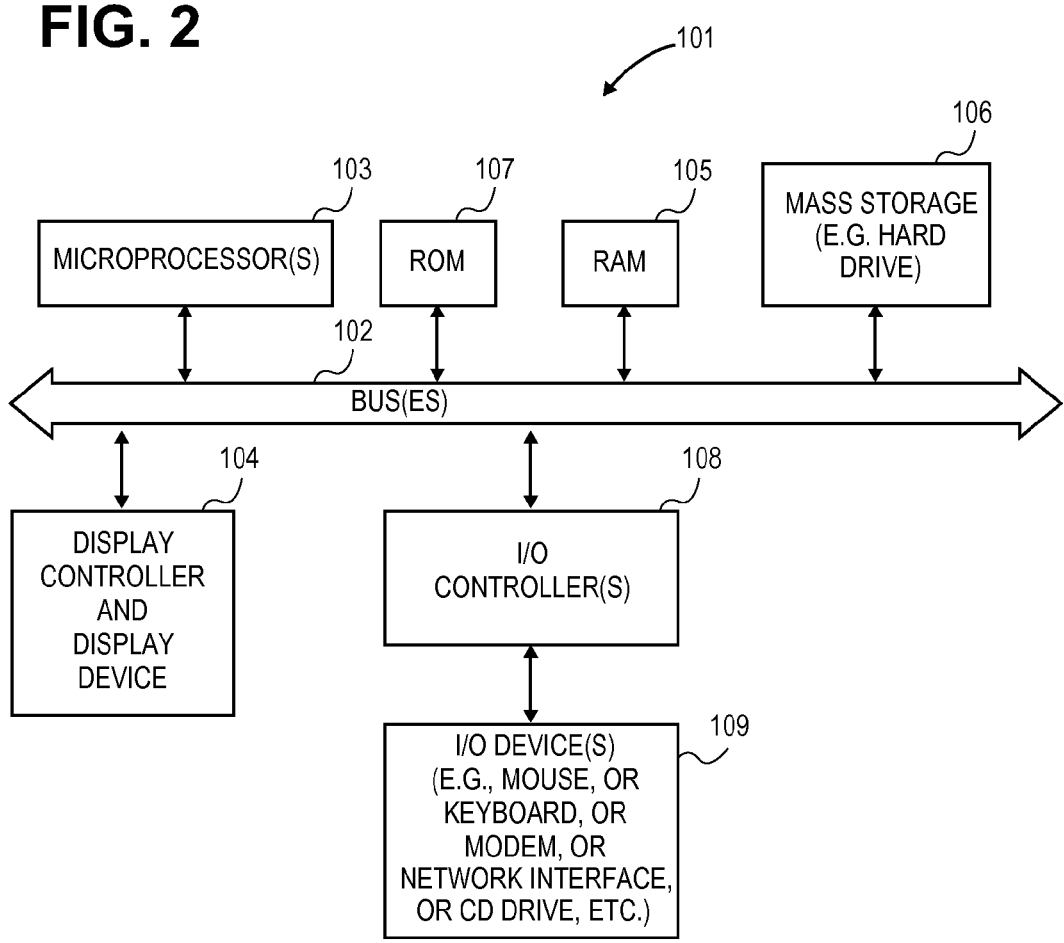
FIG. 2 shows an example of a data processing system, which may be a general purpose computer system and which may operate in any one of the various methods described herein or may use the software media described herein.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems (e.g. personal digital assistants, cellular telephones, handheld computers, etc.) which have fewer components or perhaps more components may also be used with the present invention. The computer system of FIG. 2 may, for example, be a Macintosh computer from Apple Computer, Inc.

As shown in FIG. 2, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 2 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, which may be a machine readable medium such as ROM 107, RAM 105, mass storage 106 or a remote storage device or a combination of these storage devices. In various embodiments, hardwired circuitry may be used in combination with, or as an alternative to, software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 3:
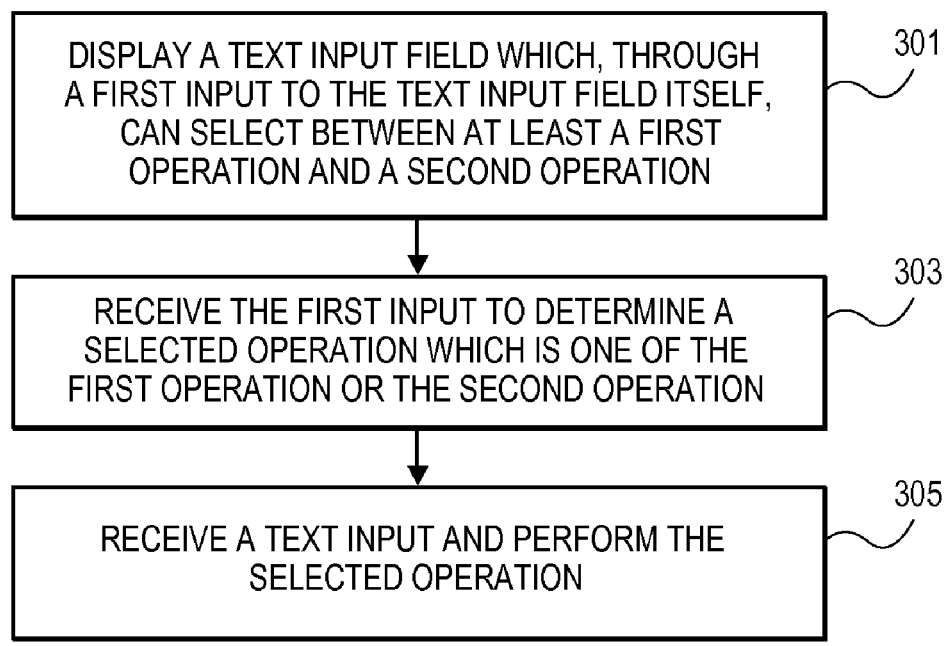
FIG. 3 shows a flow chart which shows a general exemplary embodiment of the present invention.
Figure 4A:
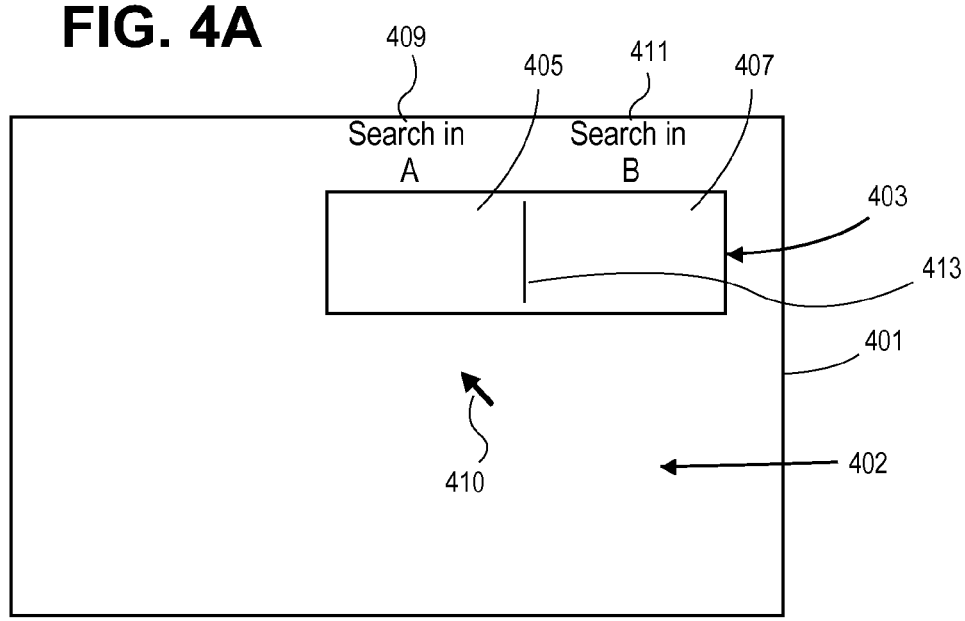
FIG. 4A shows an example of a user interface of one exemplary embodiment of the invention.

FIG. 3 shows an example of a method in which a text input field may be used to search between two or more modes of operation or to provide different operations through an interaction with the text field itself. Operation 301 includes displaying a text input field which, through a first input to the text input field itself, can select between a first operation and a second operation. This first input is typically directly in a portion of the field which is the same portion (e.g. same x, y screen or display space) which is capable of receiving text entry or alternatively within a border of the field, such as the example shown in FIG. 9. FIG. 4A shows an example of a graphical user interface in which such a text input field is displayed. In particular, FIG. 4A shows a window 401 which includes a text input field 403. A first input into the first portion 405 of the text input field 403 will cause the selection of a first operation, and an alternative first input into the second portion 407 of the text input field 403 will select the second operation. The data processing system receives in operation 203 this first input which causes the selected operation to be determined based upon the user's input. Then, the data processing system in operation 305 receives a text input and then performs the selected operation after the user has inputted the text and has indicated that the operation is to be performed (e.g. the user has typed some text and then pressed a return or enter key on a keyboard). The method of FIG. 3 will now be further explained relative to FIG. 4A, FIGS. 4B, and 4C.

While FIG. 4A shows the text input field 403 within the window 401, it may be in a different window or in a window "floating" on a desk top of a graphical user interface or associated with other objects or in a field without a window. The text input field 403 includes two portions 405 and 407 which are separated by a separator 413 as shown in FIG. 4A. Indicators 409 and 411 indicate the particular functions or operations performed as a result of the selection of an operation by a user's input directly into one or the other portions of text input field 403. The indicators may be text, such as indicators 409 and 411 as shown in FIG. 4A, or they may be icons (e.g. graphic depictions designed to convey information which identifies their purpose) or they may be a combination of text and icons. While the text input field 403 is shown as having two portions, it will be appreciated that the text input field may have more than two portions (e.g. three or five portions) which may be used to select from more than two different operations in alternative embodiments.

In a typical implementation of text input field 403, the user may select a portion by positioning a cursor displayed on a display device, such as the cursor 410 shown within the window 401 in FIG. 4A. The cursor 410 may be controlled by any number of different cursor control devices, such as a mouse, a joystick, a trackball, a track pad (touch pad) or even voice control (e.g. the user speaks to the system) through voice recognition systems. A cursor may move the mouse in two dimensions on the graphical user interface which is displayed on a display device, such as a liquid crystal display device. The user may select one portion by positioning the cursor within that portion of the text input field (or by other methods such as speech recognition). An example in which at least a portion of the cursor is positioned within the left portion of a text input field is shown in FIG. 6B, and an example in which at least a portion of the cursor is positioned within the right portion of a text input field is shown in FIG. 6C. After positioning the cursor within the desired portion of the text input field, such as portions 405 or 407 shown in FIG. 4A, the user can then cause a signal to be generated which indicates the selection of that portion. This signal may be caused by pressing and releasing a mouse's button or by pressing a key on a keyboard or by providing some other input such as a spoken word or phrase which through a speech recognition system is recognized by the computer system.

It will be appreciated that the foregoing method is one example of a direct interaction through a graphical user interface with the text input field itself in order to select the function or operation or mode of operation which is achieved by the use of a text input field. In this particular example, the user has positioned the cursor directly within the same field into which text is entered and caused the functionality of the text input field to be modified according to the selection. Alternative selection techniques may also be used. For example, the user may position the cursor within one of the portions of a text input field which are also used for text entry and then use a tab key or other key on a keyboard to select different portions or the user may cause the cursor to be positioned within a portion of the text input field for a period of time which is greater than a certain time, and this causes the system to recognize that the user has selected a portion without any other action such as a pressing of a mouse's button or a key.

Figure 4B:
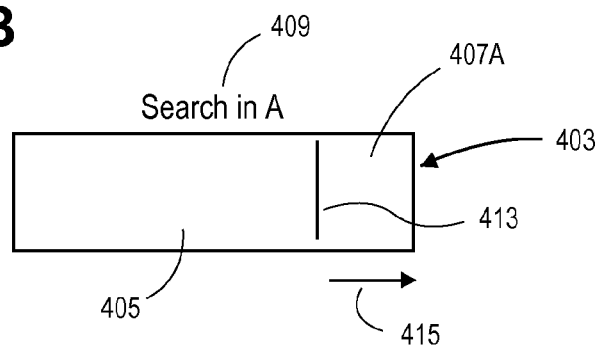
FIG. 4B illustrates an animation which may occur in a text input field in certain embodiments of the present invention.

FIG. 4B shows a portion of the graphical interface which includes the text input field 403. This figure illustrates a moment in time in which an animation occurs through the text input field as a separator 413 moves from the center of the field to the far right of the field, and ultimately disappears from the field. This animation results from the user having selected the portion 405 which then becomes enlarged as shown in FIG. 4B (relative to what is shown in FIG. 4A). Also, consistent with this animation, the indicator 409 remains displayed over the text input field 403 while the indicator 411 is removed from the display. Both the animation of the moving-separator 413 and the remaining indicator 409 both reveal to the user that the user has selected a particular operation which can now be performed by entering text into the text input field 403. The animation results in the shrinking of the right portion (portion 407) shown as a shrunken portion 407A as the separator 413 moves in the direction of the arrow 415. Alternative animations may also be used such as a color bar which moves from one side to the other side or scrolling text, etc.

Figure 4C:
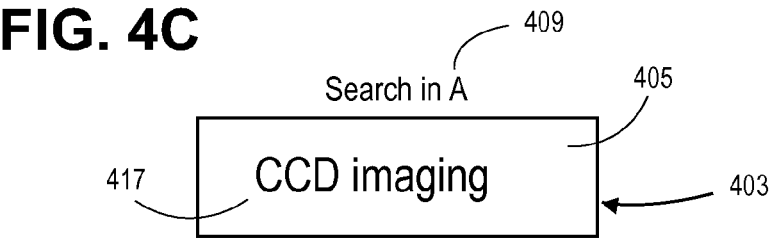
FIG. 4C shows the text entry field of FIG. 4B after the user has entered a text string into the field.

FIG. 4C shows the text input field 403 after the user has entered text 417 ("CCD imaging") into the text input field which is now completely occupied by the portion 405 as shown in FIG. 4C. At this point, the user can cause the data processing system to perform a search or perform some other operation relative to the inputted text by signaling to the data processing system to do so. In one exemplary embodiment, the user may, after having entered the text, press a key on a keyboard, such as the enter key or the return key or may speak a phrase or word which is recognized by a speech recognition system operating on the data processing system. The signal, in turn, causes the data processing system to perform the particular operation using the specified text. In the case of the example shown in FIGS. 4A-4C, the specified operation is a search in a data source A rather than a search in data source B. It will be appreciated that alternatively the user may have selected portion 407 by positioning a cursor within portion 407 and by pressing a button or otherwise signaling the selection of that portion and then causing a search to be performed in data source B after having entered text into the text input field.

Figure 5:
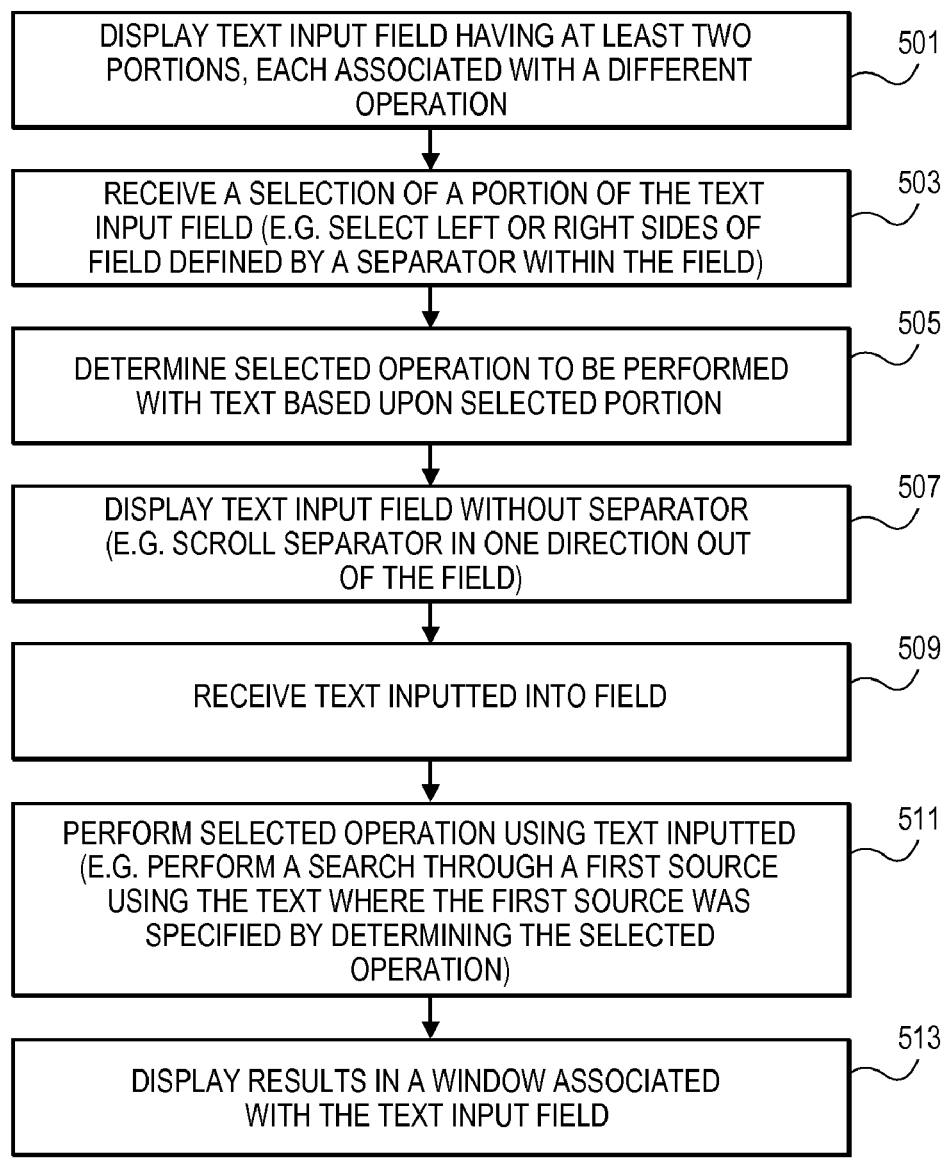
FIG. 5 is a flow chart which shows a specific exemplary embodiment of the present invention.

FIG. 5 shows a flowchart of another exemplary method of the present invention. In operation 501, a text input field having at least two portions is displayed on a display device of a data processing system. Each portion of the text input field is associated with a different operation, such as a first operation which performs a search, using the inputted text, in a first data source and a second operation which performs a search in a second data source using the inputted text. In operation 503, the data processing system receives a selection or indication from a user of a portion of the text input field itself rather than adjacent areas into which text cannot be entered. This selection may occur as described above and may involve selecting a portion of the field such as the left or right side of the field. Then in operation 505 the data processing system determines the selected operation to be performed based upon the selected portion. Then in operation 507, the text input field is displayed without a separator which is used in at least certain embodiments of the present invention. The separator may scroll in an animated fashion through the field in one direction and out of the field to indicate to the user that a selection has occurred. Then in operation 509, the data processing system receives text inputted into the field. This may occur through the actions of a user typing on a keyboard or speaking to a speech recognition system which is operating on the data processing system. Then in operation 511, the system performs a selected operation using the text which has been inputted. For example, a system may perform a search through a first data source using the text where the first source was specified by determining the selected operation. After the system has performed the operation the results of the operation may be displayed in a window associated with the text input field, such as the window 401 which includes a display area 402 which may be used to display the results of the operation, which may be a search.

Figure 6A:
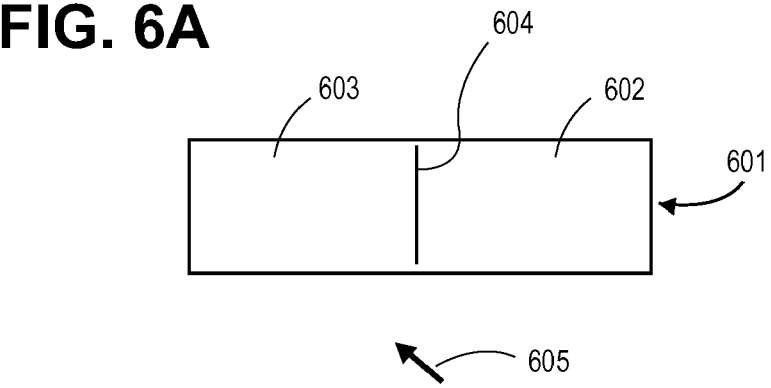
FIGS. 6A, 6B, and 6C show text entry fields which include the ability to display help information to a user.
Figure 6B:
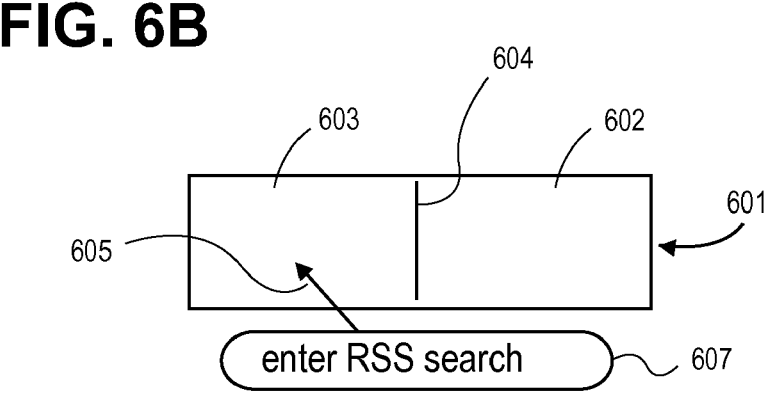
Figure 6C:
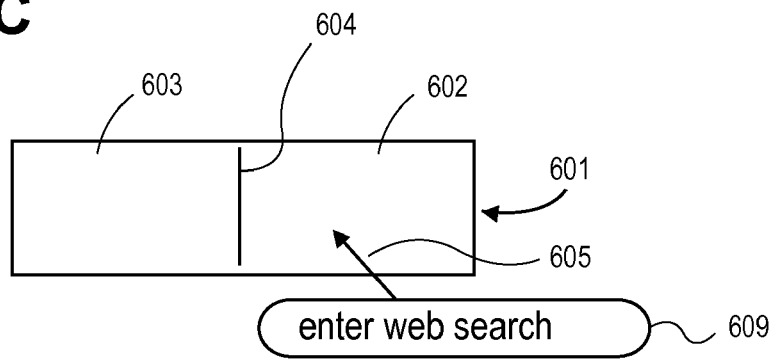

FIGS. 6A, 6B and 6C show an exemplary user interface which provides feedback to the user about the operations which may be performed within a particular text input field. The text input field 601 includes two portions 603 and 602 which are separated by the separator 604. FIG. 6A shows a portion of a graphical user interface which also includes a cursor 605 which is shown positioned below the text input field 601. The user may cause the cursor 605 to be moved (e.g. by moving a mouse which controls the position of the cursor 605) so that the cursor 605 is now positioned at least partially within the portion 603 as shown in FIG. 6B. The data processing system at this time may display an indicator 607 when the cursor 605 has been positioned at least partially within the portion 603. An example of the indicator 607 is shown in FIG. 6B. A display of the indicator 607 may occur immediately upon placing at least a portion of the cursor 605 within the portion 603 or may occur only after the cursor 605 or a portion thereof has been positioned within the portion 603 for at least a pre-determined period of time (e.g. for more than two seconds). In this fashion, a user may move the cursor through one or more portions of the text field without having an indicator appear (which may seem to clutter the display). FIG. 6C shows how, in this graphical user interface, positioning at least a portion of the cursor 605 within the portion 602 causes the display of an alternative indicator 609 which indicates the function or operation which is performed after text is entered into the portion 602. Similarly, indicator 607 indicates the operation which is performed if text is entered into the portion 603 of the text input field 601. In an alternative embodiment, the indicators 607 and 609 may be displayed within their corresponding portions of the text input field 601. In this alternative embodiment, the indicator 607 is displayed in portion 603 and the indicator 609 is in portion 602.

Figure 7:
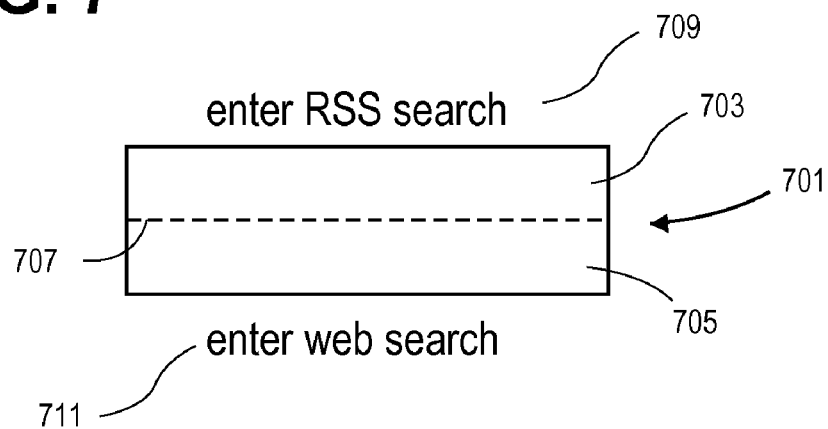
FIG. 7 shows an alternative embodiment of a text entry field which includes a horizontal separator.

FIG. 7 shows an alternative embodiment of a text entry field or text input field. In particular, FIG. 7 shows an exemplary graphical user interface of a text input field 701 which includes a horizontal separator 707 which separates the text entry or input field 701 into portions 703 and 705. The user may select portion 703 by placing the cursor within the portion and by signaling to the computer that the portion has been selected (e.g. "clicking" within the portion 703 by pressing a button, such as a mouse button, while the cursor is within the portion 703). The selection of portion 703 will cause the text input field 701 to select the "enter RSS search" operation mode, while selection of the portion 705 will cause the text input field 701 to enter the "enter web search" mode as shown by indicator 711.

Figure 8:
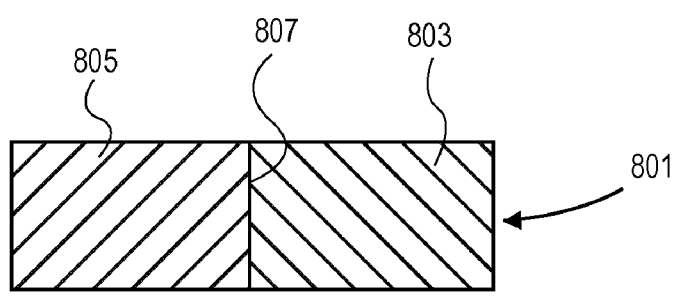
FIG. 8 shows an alternative embodiment of a text entry field which uses different colors for different portions of the text entry field.

FIG. 8 shows an alternative embodiment of a text entry field which uses colors or other visual indicators to represent the different portions to a user. In particular, the graphical user interface shown in FIG. 8 includes a text entry or input field 801 which includes a separator 807 which separates a left portion which may be a first color from a right portion which may be a second color. The colors may include gray scale (black and white only) renditions or may include other visual indicators of the different portions which represent different operations which will be selected from within the same text entry field.

As noted above, selecting different portions of the text input field causes the selection of different operations, and the number of different operations which are selectable within the text input field may be 2, 3, 4 or more operations. This selection may be done by positioning a cursor at a particular location within the text input so that the graphical location (e.g. an x, y screen position) within the text input field will determine the selected operation. Also as noted above, these different operations may involve searching in different locations or performing different types of searching. In other embodiments, the different operations may involve operations which do not include searching such as printing or saving information or the operations may include search type of operations and non-search type of operations.

It will be appreciated that, in at least certain embodiments described herein, a text input field (e.g. text input field 403) has two modes which usually exist at two different, non-overlapping times. In a first mode of the text input field, the field is designed to receive a cursor input which selects an operation from a set of operations (e.g. two or more possible operations) based on a location within, or associated with, the text input field and which switches the text input field from the first mode to a second mode. In the second mode, the text input field has had an operation selected and is typically designed to receive text input into the entire available space of the text input field. In the first mode, the text input field is normally incapable of receiving text input into the field. The text input field typically has the same displayed size in both the first and second modes, although in certain embodiments it may change size in transitioning between the two modes.

Figure 9A:
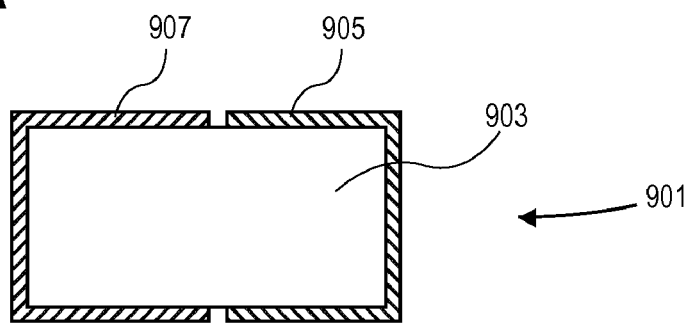
FIG. 9A shows an embodiment of a text entry field with border portions.
Figure 9B:
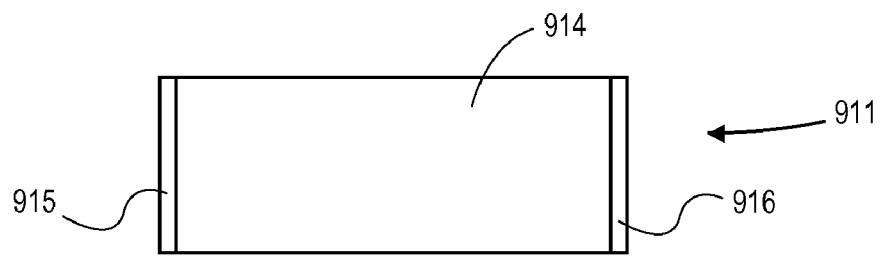
FIG. 9B shows an alternative embodiment of a text entry field with border portions.

FIGS. 9A and 9B show another embodiment in which a text input field can have different purposes (e.g. by being able to cause the performance of two different operations). In the case of the text input field 901 shown in FIG. 9A and the text input field 911 shown in FIG. 9B, the selection among different operations is done by selecting one border portion from a set of border portions, rather than a selection of a location within the text input field. In FIG. 9A, the text input field 901 is displayed with two border portions 905 and 907; it will be appreciated that the border of the text input field 901 could include more than 2 border portions. Normally, the border portions are adjacent to the text entry portion 903 of the text input field 901, and text cannot be entered into the border portions, such as border portions 905 and 907. The border portions are used to select among a set of operations, and this selection may occur by positioning a cursor over the desired border portion and by causing a signal to be generated (e.g. pressing a mouse's button) or it may occur in other ways, such as the ways described above. In addition to the border portions, indicators (such as textual indicators 409 and 411 or iconic indicators) may be displayed adjacent to their respective border portions. These indicators normally convey to the user a representation of the meaning of the operation associated with the corresponding border portion. In the case of the text input field 911, border portions 915 and 916 are displayed only at opposite ends of the text entry portion 914.

It will be appreciated that the text entry field is typically a field into which ASCII or other text characters may be entered into the field. Typically, the field can accept only a limited number of characters, although this number of characters may be rather large. Characters previously entered may scroll in one direction (e.g. to the left) as the user continues to enter additional characters when the number of characters is too large to be displayable within the screen area of the text input field.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of presenting a data input interface, the method comprising:

displaying a single text input field which, through a first input to the text input field itself, can select between at least a first operation and a second operation;

displaying, by a data processing system, a separator within the text input field, wherein a first portion and a second portion are separated by the separator;

receiving the first input to the single text input field to determine a selected operation which includes one of the first operation or the second operation, wherein the first input comprises receiving a user input in either the first portion or the second portion of the text input field, wherein the first operation is selected if the user input is positioned in the first portion when the user input is received and wherein the second operation is selected if the user input is positioned in the second portion when the user input is received, wherein the first operation is a text search through a first source of data and wherein the second operation is either a file operation or a search operation that is different than the first operation, and wherein in response to the first input, the separator automatically disappears from the text input field and the first portion dominates the entire area of the text input field if the first operation is selected and the second portion dominates the entire area of the text input field if the second operation is selected;

receiving a text input in the single text input field, the text input being displayable in the entire single text input field and performing the selected operation on the text input.

2. A method as in claim 1 wherein the second operation is a text search through a second source of data and wherein the text input is received in the text input field.

3. A method as in claim 1 wherein the first input comprises:

receiving a mouse button input while a cursor is positioned in either the first portion or the second portion of the text input field, wherein the first operation is selected if the cursor is positioned in the first portion when the mouse button input is received and wherein the second operation is selected if the cursor is positioned in the second portion when the mouse button input is received.

4. A method as in claim 1 further comprising:

displaying an animation within the text input field after receiving the first input and wherein the first input can select from among more than two operations, including the first operation and the second operation.

5. A method as in claim 1 wherein the separator scrolls in response to receiving the first input.

6. A method as in claim 1 further comprising:

displaying a first identifier to identify the first operation and displaying a second identifier to identify the second operation.

7. A method as in claim 6 wherein the first identifier is displayed after a period of time greater than a first certain time in which a cursor is positioned in the first portion of the text input field, the first portion being associated with the first operation, and wherein the second identifier is displayed after another period of time which is greater than a second certain time in which the cursor is positioned in the second portion of the text input field, the second portion being associated with the second operation.

8. A method as in claim 6 wherein the first identifier is a first name which is displayed adjacent to the text input field and the second identifier is a second name which is displayed adjacent to the text input field.

9. A method as in claim 8 wherein the first input causes one of the first identifier or the second identifier to have a modified presentation after the first input.

10. A method as in claim 9 wherein the modified presentation is a highlighting.

11. A method as in claim 1 wherein the text input is at least one of keyboard typing and speech recognition and wherein the first input is at least one of a keyboard input or a cursor control device input or speech recognition.

12. A method as in claim 1 wherein the first input also selects among at least a third operation and wherein the text input field has at least three portions separated by at least two separators.

13. A machine readable storage medium storing executable computer program instructions which, when executed by a data processing system cause the data processing system to perform a method of presenting a data input interface, the method comprising:

displaying a single text input field which, through a first input to the text input field itself, can select between at least a first operation and a second operation;

displaying a separator within the text input field, wherein a first portion and a second portion are separated by the separator;

receiving the first input to the single text input field to determine a selected operation which includes one of the first operation or the second operation, wherein the first input comprises receiving a user input in either the first portion or the second portion of the text input field, wherein the first operation is selected if the user input is positioned in the first portion when the user input is received and wherein the second operation is selected if the user input is positioned in the second portion when the user input is received, wherein the first operation is a text search through a first source of data and wherein the second operation is either a file operation or a search operation that is different than the first operation, and wherein in response to the first input, the separator automatically disappears from the text input field and the first portion dominates the entire area of the text input field if the first operation is selected and the second portion dominates the entire area of the text input field if the second operation is selected;

receiving a text input in the single text input field, the text input being displayable in the entire single text input field and performing the selected operation on the text input.

14. A medium as in claim 13 wherein the second operation is a text search through a second source of data and wherein the text input is received in the text input field.

15. A medium as in claim 13 wherein the first input comprises:

receiving a mouse button input while a cursor is positioned in either the first portion or the second portion of the text input field, wherein the first operation is selected if the cursor is positioned in the first portion when the mouse button input is received and wherein the second operation is selected if the cursor is positioned in the second portion when the mouse button input is received.

16. A medium as in claim 13, the method further comprising:

displaying an animation within the text input field after receiving the first input and wherein the first input can select from among more than two operations, including the first operation and the second operation.

17. A medium as in claim 13 wherein the separator scrolls in response to receiving the first input.

18. A medium as in claim 13, the method further comprising:

displaying a first identifier to identify the first operation and displaying a second identifier to identify the second operation.

19. A medium as in claim 18 wherein the first identifier is displayed after a period of time which is greater than a first certain time in which a cursor is positioned in the first portion of the text input field, the first portion being associated with the first operation, and wherein the second identifier is displayed after another period of time which is greater than the second certain time in which the cursor is positioned in a second portion of the text input field, the second portion being associated with the second operation.

20. A medium as in claim 18 wherein the first identifier is a first name which is displayed adjacent to the text input field and the second identifier is a second name which is displayed adjacent to the text input field.

21. A medium as in claim 20 wherein the first input causes one of the first identifier or the second identifier to have a modified presentation after the first input.

22. A medium as in claim 21 wherein the modified presentation is a highlighting.

23. A medium as in claim 13 wherein the text input is at least one of keyboard typing and speech recognition and wherein the first input is at least one of a keyboard input or a cursor control device input or speech recognition.

24. A medium as in claim 13 wherein the first input also selects among at least a third operation and wherein the text input field has at least three portions separated by at least two separators.

25. A data processing system comprising:
a display device;
a processor system;
a memory coupled to the processor system and to the display device, wherein the processor causes the display device to display a single text input field which, through a first input to the text input field itself, can select between at least a first operation and a second operation and wherein the processor system causes the display device to display a separator within the text input field and wherein a first portion and a second portion of the text input field are separated by the separator and wherein the processor system receives the first input to the single text input field to determine a selected operation which is one of the first operation or the second operation and the processor system receives a text input in the single text input field, the text input being displayable in the entire single text input field and performs the selected operation on the text input wherein the first input comprises receiving a user input in either the first portion or the second portion of the text input field, wherein the first operation is selected if the user input is positioned in the first portion when the user input is received and wherein the second operation is selected if the user input is positioned in the second portion when the user input is received, wherein the first operation is a text search through a first source of data and wherein the second operation is either a file operation or a search operation that is different than the first operation, and wherein in response to the first input, the separator automatically disappears from the text input field and the first portion dominates the entire area of the text input field if the first operation is selected and the second portion dominates the entire area of the text input field if the second operation is selected.

26. A data processing system as in claim 25 wherein the processor system comprises a first microprocessor and a second microprocessor.

27. A data processing system as in claim 25 wherein the the second operation is a text search through a second source of data using the text input.

28. A data processing system as in claim 25 wherein an animation is displayed within the text input field after receiving the first input and wherein the first input can select from among more than two operations, including the first operation and the second operation.

29. A data processing system as in claim 25 wherein the separator scrolls in response to receiving the first input.

30. A display having a single text input field comprising:
a displayed first portion to receive a first input to the single text input field specifying a first operation using text entered into the single text input field wherein the text is displayable in the entire single text input field;
a displayed second portion to receive a second input to the single text input field specifying a second operation using text entered into the single text input field, the displayed first portion and the displayed second portion being operatively coupled to a memory to store data for the single text input field, wherein the display shows the displayed first and second portions and wherein the text is displayable in the entire single text input field and wherein a separator is displayed within the text input field, wherein the first portion and the second portion are separated by the separator and wherein the first input comprises receiving a user input in either the first portion or the second portion of the text input field, wherein the first operation is selected if the first input is positioned in the first portion when the first input is received and wherein the second operation is selected if the second input is positioned in the second portion when the second input is received, wherein the first operation is a text search through a first source of data and wherein the second operation is either a file operation or a search operation that is different than the first operation, and wherein in response to the first input or the second input, the separator automatically disappears from the text input field and the first portion dominates the entire area of the text input field if the first operation is selected and the second portion dominates the entire area of the text input field if the second operation is selected.

31. A text input field as in claim 30 wherein the displayed first portion and the displayed second portion are controlled by executable computer program instructions which are stored in a machine readable medium.

32. A machine readable storage medium storing executable computer program instructions which, when executed by a data processing system, cause the data processing system to perform a method of presenting a data input interface, the method comprising:
displaying a single text input field in a first mode during a first time;
displaying the single text input field in a second mode during a second time which is different than the first time, wherein in the first mode the single text input field is to receive a first input which specifies an operation based on a location associated with the single text input field and which switches the single text input field from the first mode to the second mode, and wherein in the second mode, the single text input field is to receive the text input and wherein the single text input field is incapable of receiving text input in the first mode and wherein the location associated with the single text input field selects among a plurality of operations which are executed using text inputted into the single text input field and wherein the location associated with the single text input field is located within the single text input field and wherein the text input is displayable in the entire single text input field and wherein a separator is displayed within the text input field, wherein a first portion of the text input field and a second portion of the text input field are separated by the separator and wherein the first input comprises receiving a user input in either the first portion or the second portion of the text input field, wherein a first operation in the plurality of operations is selected if the user input is positioned in the first portion when the user input is received and wherein a second operation in the plurality of operations is selected if the user input is positioned in the second portion when the user input is received, wherein the first operation is a text search through a first source of data and wherein the second operation is either a file operation or a search operation that is different than the first operation, and wherein in response to the first input, the separator automatically disappears from the text input field and the first portion dominates the entire area of the text input field if the first operation is selected and the second portion dominates the entire area of the text input field if the second operation is selected.

33. A machine readable medium as in claim 32 wherein the plurality of operations is greater than two different operations.

34. A machine readable storage medium storing instructions which when executed in a data processing system cause the data processing system to perform a method comprising:

displaying a single text input field in a first mode in which the single text input field is to receive a first input which selects from a set of different operations based on a location within the single text input field, wherein a separator is displayed within the text input field, wherein a first portion of the text input field and a second portion of the text input field are separated by the separator and wherein the first input comprises receiving a user input in either the first portion or the second portion of the text input field, wherein a first operation in the set of different operations is selected if the user input is positioned in the first portion when the user input is received and wherein a second operation in the set of different operations is selected if the user input is positioned in the second portion when the user input is received, wherein the first operation is a text search through a first source of data and wherein the second operation is either a file operation or a search operation that is different than the first operation, and wherein in response to the first input, the separator automatically disappears from the text input field and the first portion dominates the entire area of the text input field if the first operation is selected and the second portion dominates the entire area of the text input field if the second operation is selected;

displaying the text input field in a second mode in which the single text input field is to receive text input within an available space of the single text input field, wherein the text input is displayable within the entire single text input field.

35. A machine readable medium as in claim 34 wherein each operation in the set of different operations uses text inputted in the text input field for different purposes or in different ways.

\* \* \* \* \*